(12) United States Patent
Alderman

(10) Patent No.: US 6,591,778 B1
(45) Date of Patent: Jul. 15, 2003

(54) PET BED

(76) Inventor: John Patterson Alderman, 10 Mumbulla St., Bermagui, New South Wales 2546 (AU)

(*) Notice: Subject to any disclaimer, the term of this patent is extended or adjusted under 35 U.S.C. 154(b) by 0 days.

(21) Appl. No.: 09/297,355

(22) PCT Filed: Oct. 28, 1997

(86) PCT No.: PCT/AU97/00718

§ 371 (c)(1), (2), (4) Date: Apr. 29, 1999

(87) PCT Pub. No.: WO98/19521

PCT Pub. Date: May 14, 1998

(30) Foreign Application Priority Data

Nov. 1, 1996 (AU) .................................. PO3372

(51) Int. Cl.[7] .......................... A01K 29/00; A47C 4/38; A47C 4/48
(52) U.S. Cl. ................ 119/28.5; 297/16.1; 297/18; 297/24
(58) Field of Search ................. 119/28.5; D30/118; 297/16.1, 16.2, 18, 24

(56) References Cited

U.S. PATENT DOCUMENTS

| 67,119 | A | * | 7/1867 | Hyde | |
|---|---|---|---|---|---|
| 358,528 | A | * | 3/1887 | Banks | |
| 1,344,431 | A | * | 6/1920 | Albertie | |
| 1,557,813 | A | * | 10/1925 | Derse et al. | |
| 1,587,706 | A | * | 6/1926 | Dozier | |
| 2,375,819 | A | * | 5/1945 | Reid | |
| 2,713,890 | A | * | 7/1955 | Mack | |
| 3,338,625 | A | * | 8/1967 | Jung-Shien | |
| 3,565,040 | A | * | 2/1971 | Pohl | 119/28.5 |
| 3,838,883 | A | * | 10/1974 | Machen | 297/16.2 |
| 4,103,965 | A | * | 8/1978 | Engman | 297/188.12 |
| 4,148,520 | A | * | 4/1979 | Miller | 297/16 |
| 4,239,280 | A | * | 12/1980 | Ackerman | 297/18 |
| 4,241,950 | A | * | 12/1980 | Simpson | 297/18 |
| 4,251,106 | A | * | 2/1981 | Gilbert | 297/18 |
| 4,836,601 | A | * | 6/1989 | Cone | 297/16.2 |
| 5,072,694 | A | * | 12/1991 | Haynes et al. | 119/482 |
| 5,320,404 | A | * | 6/1994 | Gal | 297/16.2 |
| 5,496,094 | A | * | 3/1996 | Schwartzkopf et al. | 297/45 |
| 5,709,428 | A | * | 1/1998 | Hugghins | 297/16.2 |
| 5,851,052 | A | * | 12/1998 | Gustafsson | 297/16.2 |

* cited by examiner

Primary Examiner—Yvonne Abbott

(57) ABSTRACT

A pet bed (1) for use on a floor, the pet bed (1) including a pair of frames (2), each including a floor engaging end (4) and an upper end (6) distal the floor engaging end (4). Hinge means (8) interconnect the frames (2) intermediate the floor engaging end (4) and the upper end (6), to form a scissor arrangement (10), and a flexible sling (12) extends between the upper ends (6) of the frame (2) to define a support area (14) for a pet. In use, the frames (2) engage the floor at an angle of less than 45°.

16 Claims, 3 Drawing Sheets

PET BED

The present invention relates to a bed and more particularly to a bed for a pet animal.

The invention has been developed primarily as a dog bed, and will be described hereinafter with reference to this application. However, it will be appreciated that the invention is not limited to this field of use.

Owners of pet animals are faced with a number of requirements to ensure the animal's health and well being. Along with-sufficient food and appropriate medical care, it is necessary to provide suitable bedding which ensures the animal is physically comfortable when sleeping or resting. In view of the fact that many animals are housed out of doors or in relatively cold areas such as laundries indoors, ensuring that the animal does not catch a chill from cold flooring when sleeping is of considerable importance.

In the past, one approach has been to provide piles of bedding such as blankets or rugs, which form a thermal barrier between the cold floor and the sleeping animal. However, such an arrangement is relatively untidy and lacks aesthetic appeal. This problem has been reduced somewhat in the past by providing some form of base, such as a wicker basket, which holds bedding within a particular defined area. However, wicker baskets and the like tend to be difficult to keep clean, especially in regions where fleas and other parasites are a problem.

Another, more recent solution has been to provide a raised bed, comprising a rigid frame with a flexible covering. The covering can take the form of a flexible, trampoline-like mat, or can simply be hessian or some other suitably strong fabric. The frame is typically rectangular, with rigid legs extending downwardly to engage the floor. In some cases these legs are detachable by means of wing nuts or the like, to enable easier transportation or storage. Whilst this arrangement is an improvement over the wicker basket, it still has some disadvantages associated with it. In particular, the rigid nature of the frame means that the animal is not provided with a supple bed. In the case of large or heavy dogs in particular, this can be a problem, since bone and skin problems can arise from inadequate bedding. Furthermore, such beds typically require manipulation of a number of fastening bolts to enable the bed to fold down for storage or transport.

It is an object of the present invention to provide a pet bed which may be readily folded and dismantled for transport or storage.

According to this invention there is provided a pet bed for use on a floor, the pet bed including:
- a pair of frames, each including a floor engaging end and an upper end distal the floor engaging end;
- hinge means interconnecting the frame intermediate the floor engaging end and the upper end, to form a scissor arrangement;
- a flexible sling extending between the upper ends of the frames to define a support are for a pet;
- wherein, in use, the frames engage the floor at an angle of less than 45°;
- each of the frames comprising first and second sub-frames;
- each sub-frame including a pair of arms linked by an intermediate member;
- a distal end of each arm including connection means allowing each pair of sub-frames to be linked together.

Preferably the frames engage the floor at an angle of less then about 30°.

Preferably also, the pet bed includes linking means extending between adjacent linking points on the frames, each linking point being disposed intermediate the floor engaging portions and hinge means on each of the frames.

In a particularly preferred emibodiment, each of the frames comprises first and second sub-frames, each sub-frame including a pair of arms linked by an intermediate member. A distal end of each arm includes connection means allowing each pair of sub-frames to be linked together. Preferably, the connection means takes the form of telescopically engageable portions.

The invention will now be described with reference to the accompanying drawings, in which.

Figure 1:
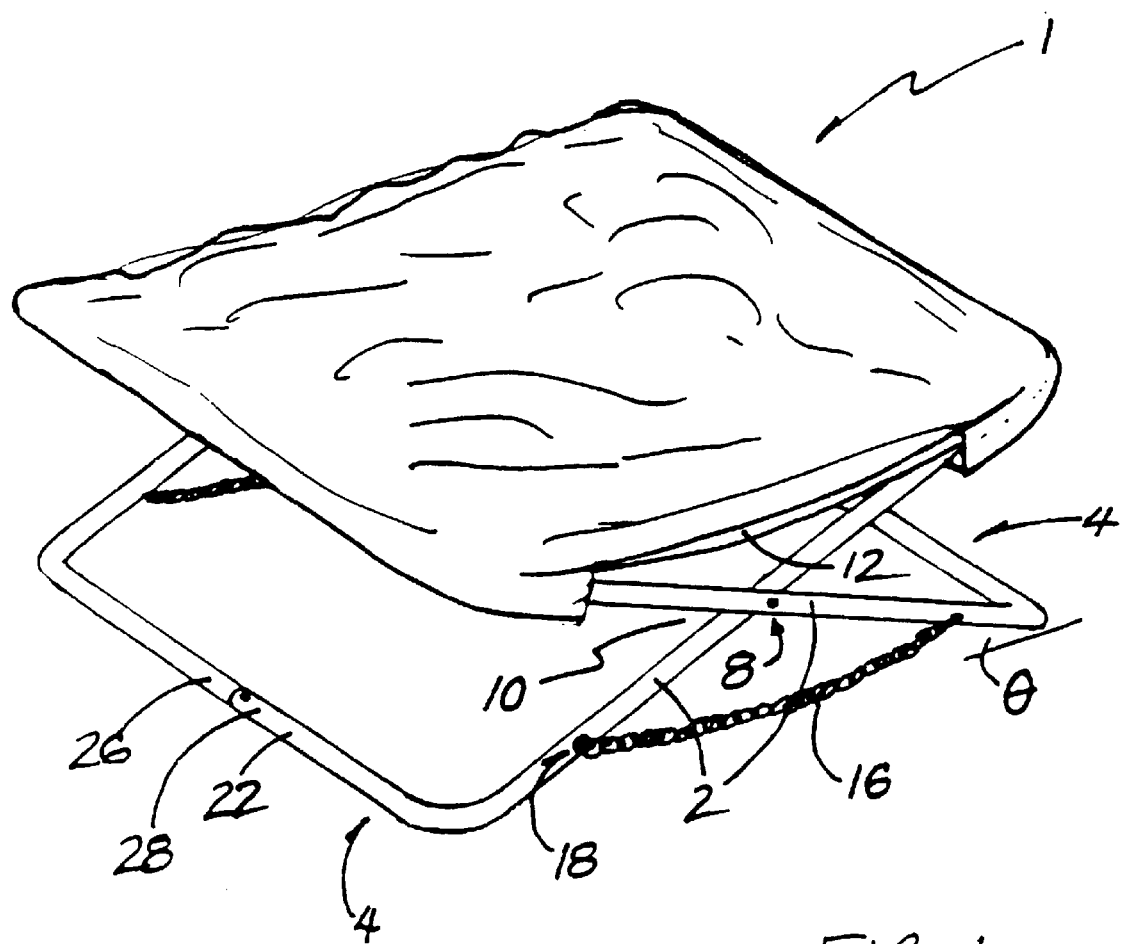
FIG. 1 is a perspective view of dog bed according to the invention.
Figure 2:
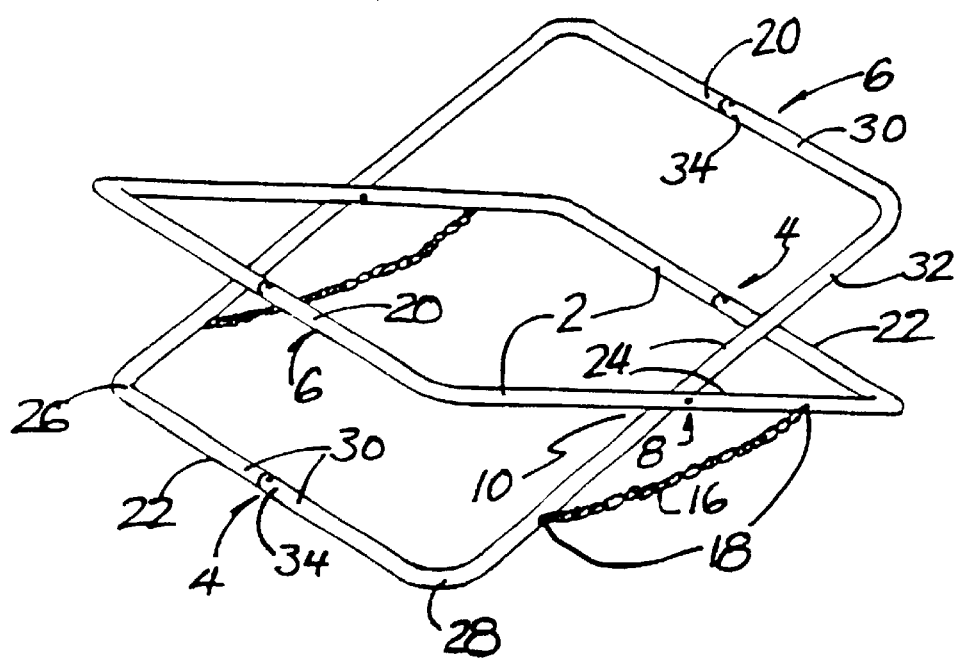
FIG. 2 is an exploded perspective view of the dog bed shown in FIG. 1.
Figure 3:
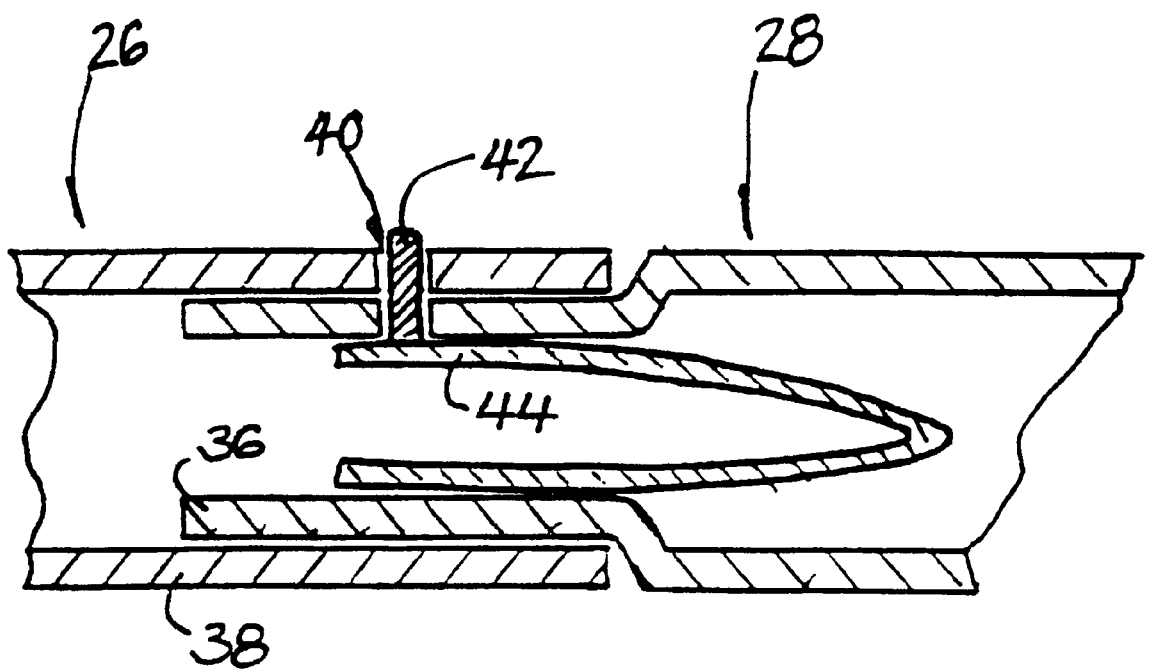
FIG. 3 is a detailed longitudinal cross section of telescopically engaged sub-frames shown in FIG. 1.

Referring to the drawings, a pet bed 1 includes a pair of frames 2 each including a floor engaging end 4 and an upper end 6 distal the floor engaging end. The frames 2 are interconnected by hinges 8 to form a scissor arrangement 10. A flexible sling 12 extends between the upper ends 6 of the frames 2 to define a support area 14 for a pet. When assembled, the frames 2 engage the floor at an angle $\theta$ of about 25–40°.

Linking means in the form of chains 16 extend between adjacent linking points 18 or the frames 2. Each of the linking points 18 is disposed intermediate the floor engaging portion 4 and hinge 8 on each of the respective frames 2. Whilst the linking means take the form of chains in a preferred embodiment, other flexible means such as cord or wire may be used. Alternatively, relatively rigid linking means such as a rod (not shown) may be used, depending upon the particular application.

The frames 2 are generally rectangular, a first edge 20 of each rectangle defining the upper end and a second edge 22 opposite the first edge defining the floor engaging end 4. The hinges 8 are disposed on the remaining sides 24, intermediate the first and second edges 20, 22.

In the embodiment shown, each of the frames comprises first and second sub-frames 26 and 28, each of which includes a pair of arms 30 linked by an intermediate member 32. A distal end 34 of each arm includes connection means in the form of telescopically engageable formations 36 and 38 respectively. The first and second sub-frames may be locked together when telescopically engaged by means of overlapping holes 40 and peg 42. Peg 42 is biased outwardly by means of spring 44, which, in the preferred form is a folded leaf spring. However, any suitable form of connection and locking means may be used. The flexible sling 12 is covered by a padded mat 46 which includes pockets 48 at either end to engage the upper ends 6 of the frames 2.

In use, the disassembled dog bed is laid our prior to assembly. The first and second sub-frames 26 and 28 are clipped together, thereby forming the completed frames 2. If not already in place, the flexible sling 12 is laced into position, looped around the first edges 20 of the frames 2. In cases where the chains 16 are omitted, the sling itself provides the necessary tension to maintain the frames at the desired angle with respect to the ground. Finally, the padded mat 46 is added by hooking the pockets 43 into position over the first edges 20 of the frames 2.

The frames are then folded out about hinges 8, the chains 16 preventing the frames from simply rotating with respective to each other onto the floor. In the embodiment shown, the frames 2 form an angle θ with the ground of about 25–40°. However, other angles less than around 45° may also be suitable, depending upon the size and configuration of the bed itself, and the anticipated load it is to carry. Disassembly of the dog bed is the reverse of assembly. Due to its configuration, the sling and padded mat may simply be left in place and folded within the scissor mechanism. To disassemble the first and second sub-frames, peg 42 is pressed inwardly against the bias of the spring until it disengages the outer telescopic portion, thereby allowing the telescopic portions to slide apart.

The present invention offers a number of advantages over the prior art. Firstly, it is quite portable and easy to disassemble. Where sub-frames are provided, the bed may be folded into a relatively compact form for easy storage, transport or to minimize its use of shelf space in shops where it is sold. Furthermore, the relatively small angle made with the ground by the frames reduces the tendency of the bed to "fold up" upon application of weight compared with camp stools or the like. Furthermore, this arrangement, coupled in a preferred embodiment with lightweight tubular aluminium or steel construction allows a certain amount of "give" when the pet initially applies its weight, which in turn makes the bed more comfortable than rigid beds. For all of these reasons, the present invention represents a commercially significant advance over the prior art.

Although the invention has been described with reference to a particular example, it will be appreciated by those skilled in the art that the invention may be embodied in many other forms.

What is claimed is:

1. A pet bed for use on a floor, the pet bed including:
   a pair of frames, each including a floor engaging end and an upper end distal the floor engaging end;
   hinge means interconnecting the frame intermediate the floor engaging end and the upper end, to form a scissor arrangement;
   a flexible sling extending between the upper ends of the frames to define a support area for a pet;
   wherein, in use, the frames engage the floor at an angle of less than 45°;
   each of the frames comprising first and second sub-frames;
   each sub-frame including a pair of arms linked by an intermediate member;
   a distal end of each arm including connection means allowing each pair of sub-frames to be linked together.

2. A pet bed according to claim 1, wherein the frames engage the floor at an angle of less than about 30°.

3. A pet bed according to claim 1 or claim 2, further including linking means extending between adjacent linking points on the frames each linking point being disposed intermediate the floor engaging portion and hinge means on each of the frames.

4. A pet bed according to claim 3, wherein the linking means is flexible.

5. A pet bed according to claim 4, wherein the linking means is a chain or cord.

6. A pet bed according to claim 3, wherein the linking means is rigid.

7. A pet bed according to claim 6, wherein the linking means is a rod.

8. A pet bed according to claim 1, wherein the frames are generally rectangular, a first edge of each rectangle defining the upper end, a second edge of the rectangle opposite the first defining the floor engaging portion, and the hinge means being disposed on the remaining sides intermediate the first and second edges.

9. A pet bed according to claim 1, wherein each pair of sub-frames may be selectively locked together.

10. A pet bed according to claim 1, wherein the connection means on adjacent arms takes the form of telescopically interengageable portions.

11. A pet bed according to claim 10, further including a spring-loaded peg, and a hole associated with each of the telescopically engageable portions, configured such that, in use, each pair of holes overlaps, and the spring-loaded peg passes through each pair to lock the sub-frames together.

12. A pet bed according to claim 1, wherein the sling includes attachment means to hold it in position between the upper ends of the frames.

13. A pet bed according to claim 12, wherein the sling is looped about the upper ends of the frame.

14. A pet bed according to claim 13, wherein the sling includes pockets formed at either end, the pockets being configured to hook over respective upper ends of the frames.

15. A pet bed according to claim 1, further including a padded mat extending between upper ends of the frames to rest atop the support area defined by the sling.

16. A pet bed according to claim 15, wherein the padded mat includes packets formed at either end the pockets being configured to hook over respective upper ends of the frames.

* * * * *